United States Patent

Horn

(10) Patent No.: US 8,576,819 B2
(45) Date of Patent: Nov. 5, 2013

(54) ROUTING DATA IN A CLUSTER

(75) Inventor: Gavin Bernard Horn, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/557,264

(22) Filed: Jul. 25, 2012

(65) Prior Publication Data

US 2012/0287893 A1 Nov. 15, 2012

Related U.S. Application Data

(63) Continuation of application No. 11/678,062, filed on Feb. 23, 2007, now Pat. No. 8,254,349.

(51) Int. Cl.
*H04W 72/04* (2009.01)

(52) U.S. Cl.
USPC .......................................... 370/338; 370/221

(58) Field of Classification Search
USPC .......... 455/436, 442; 370/221, 335, 338, 352, 370/353
See application file for complete search history.

(56) References Cited

U.S. PATENT DOCUMENTS

| | | |
|---|---|---|
| 7,260,638 B2 | 8/2007 | Crosbie |
| 7,321,316 B2 | 1/2008 | Hancock et al. |
| 8,254,349 B2 | 8/2012 | Horn |
| 2002/0103893 A1 | 8/2002 | Frelechoux et al. |
| 2006/0066455 A1 | 3/2006 | Hancock et al. |

*Primary Examiner* — Sam Bhattacharya
(74) *Attorney, Agent, or Firm* — Dang M. Vo

(57) ABSTRACT

Various techniques for routing data through a cluster are disclosed. The cluster includes a number of nodes that support communications by an access terminal. A node may be configured to use an identifier assigned to an access terminal to route data associated with the access terminal to another node in the cluster. The identifier is assigned by any node in the cluster.

26 Claims, 9 Drawing Sheets

ROUTING DATA IN A CLUSTER

CLAIM OF PRIORITY UNDER 35 U.S.C. §120

The present Application for Patent is a Continuation of patent application Ser. No. 11/678,062 entitled "ROUTING DATA IN A CLUSTER" filed Feb. 23, 2007, pending, and assigned to the assignee hereof and hereby expressly incorporated by reference herein.

BACKGROUND

1. Field

The present disclosure relates generally to telecommunications, and more particularly, to techniques for routing data through a cluster.

2. Background

A wide area network (WAN) is a communications network that covers a large geographic region. Typically, a WAN is used to connect a large number of communication devices together. The largest and most well-known example of a WAN is the Internet.

In contrast to the broad regional coverage of a WAN, a local area network (LAN) is commonly used to connect together a number of communication devices in a limited area, such as a home, office, or public building. Typically, any number of LANs may be connected together through a WAN to enable users in one location to communicate with users in other locations.

Recently, there has been a tremendous growth in the deployment of wireless LANs (WLAN). A WLAN enables users on mobile handsets to move around within a limited coverage region and still remain connected to the LAN. These WLANs have paved the way for more sophisticated mobile handsets, which traditionally had been designed for voice communications. Today, there is an increasing demand for additional services including e-mail, web-browsing, video broadcasts, etc. The integration of these services into mobile handsets poses various technological challenges for the wireless industry. These challenges include restricted memory capacity and bandwidth considerations, just to name a few. As the wireless industry prepares to meet these challenges, there exists a need for new technology that reduces processing complexity and minimizes the transmission of overhead information through WLANs.

SUMMARY

An aspect of a node is disclosed. The node is configured to operate in a cluster. The node includes a frame buffer configured to use an identifier assigned to an access terminal to route data associated with the access terminal to another node in the cluster. The identifier is assigned by any node in the cluster.

Another aspect of a node is disclosed. The node is configured to operate in a cluster. The node includes means for interfacing to another node in the cluster, and means for using an identifier assigned to an access terminal to route data associated with the access terminal to said another node. The identifier is assigned by any node in the cluster.

A method of operating a node in a cluster is disclosed. The method includes using an identifier assigned to an access terminal to route data associated with the access terminal to said another node. The identifier is assigned by any node in the cluster.

A processor configured to enable a node to operate in a cluster is disclosed. The processor includes means for interfacing to a transceiver, and means for using an identifier assigned to an access terminal to route data associated with the access terminal to said another node through the transceiver, wherein the identifier is assigned by any node in the cluster.

A computer program product is disclosed. The computer program product includes computer-readable medium including code to cause a computer operating in a node of a cluster to use an identifier assigned to an access terminal to route data associated with the access terminal to another node. The identifier is assigned by any node in the cluster.

It is understood that other aspects of the invention will become readily apparent to those skilled in the art from the following detailed description, wherein it is shown and described only various aspects of the invention by way of illustration. As will be realized, the invention is capable of other and different aspects and its several details are capable of modification in various other respects, all without departing from the scope of the invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various aspects of the invention and is not intended to represent the only aspects in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
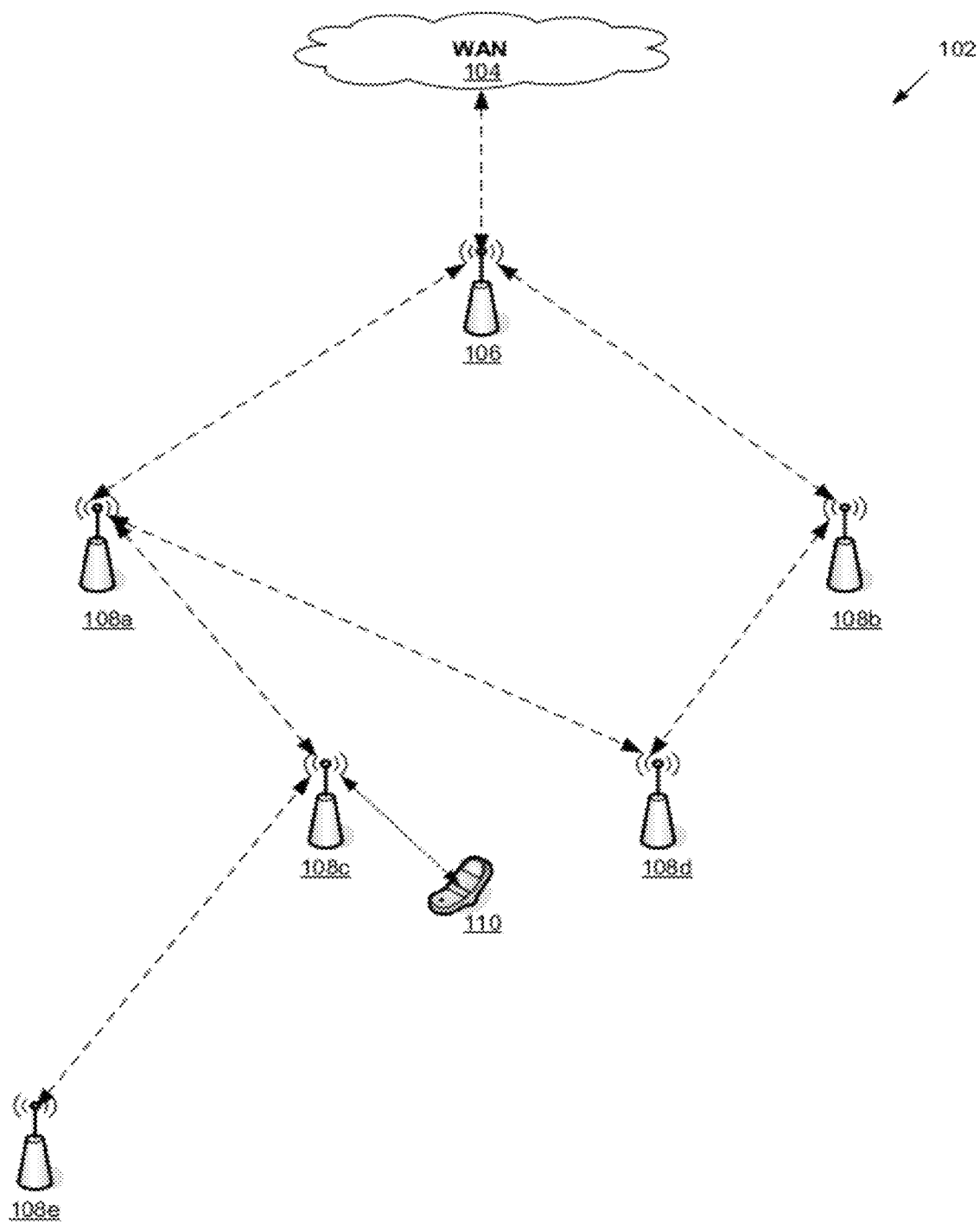
FIG. 1 is a conceptual block diagram illustrating an example of a cluster.

Various concepts presented throughout this disclosure may be utilized across a broad array of networks and communication protocols. One non-limiting example is shown in FIG. 1 where a cluster 102 is connected to a WAN 104. A "cluster" is formed by a number of nodes that join together to provide backhaul services to other nodes in the cluster. In a cluster, data is routed from one node to another until the data reaches its destination. The destination may be a WAN 104 as shown in FIG. 1, or another node in the same or different cluster. A cluster provides a continuous connection through one or more intermediates nodes and is dynamically reconfigurable to maintain a connection when one or more nodes in the cluster fails.

The cluster 102 in FIG. 1 is shown with a node 106 having a wired backhaul connection to the WAN 104 through a network router (not shown). This node 106 will be referred to as a "root access point" (RAP). In this example, the network router is integrated into the RAP 106, but alternatively, the network router may be separate from the RAP. The cluster 102 is shown with five additional nodes 108a-108e dispersed throughout the geographic coverage region, but may include any number of nodes depending on the geographic reach of the cluster 102. Each of these nodes will be referred to as a "wireless access point" (WAP) because of its wireless backhaul connection to another node in the cluster 102. Each WAP 108a-108e may be fixed or mobile. Each node in the cluster 102 may be referred to by those skilled in the art as an access point, NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology. The various concepts described throughout this disclosure are intended to apply to all nodes capable of operating in a cluster regardless of their specific nomenclature.

An access terminal 110 in the cluster 102 may access the WAN 104 by establishing a radio link with any node in the cluster 102 (i.e., a RAP 106 or a WAP 108a-108e). The access terminal 110 may be any suitable mobile communications device, including by way of example, a mobile telephone, a personal digital assistant (PDA), a portable television, a personal computer, a laptop computer, a digital camera, a digital camcorder, a game console, a portable audio device, a portable radio, or any other suitable device capable of supporting a radio link with a node in the cluster 102.

The cluster 102 is formed by establishing radio links between the nodes. In the aspect shown in FIG. 1, a radio path is created between the RAP 106 and the access terminal 110 through two intermediate WAPs 108a, 108c. The radio path may be dynamically reconfigurable to provide a continuous connection to the WAN 104 for the access terminal AT 110. By way of example, a new radio path can be established between the RAP 106 and the access terminal 110 through intermediate WAPs 108b, 108d due to quality of service (QoS) requirements, load balancing, backhaul constraints, or the failure of intermediate WAP 108a or 108c. The ability to reconfigure the radio path also enables access terminal mobility. It allows the access terminal to maintain a continuous connection to the WAN 104 as it moves through the cluster 102. In the example illustrated in FIG. 1, a new radio path may be established between the RAP 106 and the access terminal 110 through intermediate WAPs 108b, 108d as the access terminal 110 moves from left to right across FIG. 1.

The radio links between the nodes may be supported using any wireless protocol. By way of example, the links may be implemented using World Interoperability for Microwave Access (WiMAX), infrared protocols such as Infrared Data Association (IrDA), Bluetooth, Ultra-Wide Band (UWB), Wireless Fidelity Alliance (Wi-Fi Alliance), or any other suitable protocol, or any combination thereof. The actual wireless protocol implemented in any particular cluster will depend on the specific application and the overall design constraints imposed on the overall system.

Figure 2:
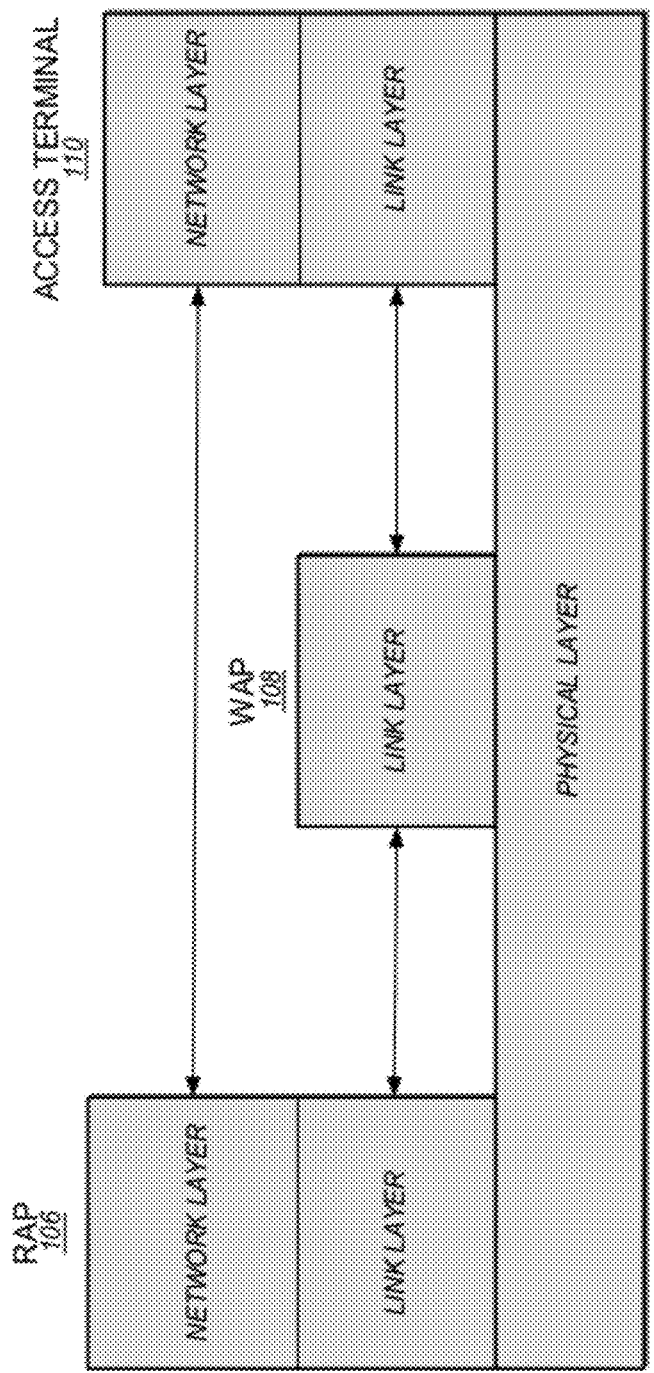
FIG. 2 is a diagram illustrating an example of a protocol stack for nodes in a cluster.

FIG. 2 is a diagram illustrating an example of a protocol stack for an access terminal 110 connected to a RAP 106 through one intermediate WAP 108. In its simplest form, the protocol stack includes a network layer, a link layer and a physical layer. The network layer is responsible for routing data between the source and destination and the link layer is responsible for routing between the individual nodes. The link layer includes a Media Access Control (MAC) protocol, which provides addressing and access to the physical layer. The physical layer is responsible for channel structure, frequency, power, modulation, and encoding.

In this example, the network layer is connected between the RAP 106 and the access terminal 110. This configuration allows all network layer functionality to lie outside the WAPs 108a-108e in the cluster. As a result, header compression for data packets sent across the WAN can be performed between the RAP 106 and the access terminal 110, thus conserving valuable bandwidth within the cluster. In addition, security protocols for secured network communications may also be performed between the RAP 106 and the access terminal 110, thus eliminating the need to route encryption keys through the cluster.

In some traditional cluster networks, the routing is done at the network layer using the network address for the access terminal in the header of the data packet. In other traditional cluster networks, the routing is done at the link layer using a unique link layer address permanently assigned to the access terminal 110. For example, WiFi and ethernet use a 48-bit extended unique identifier (EUI-48) assigned by the manufacturer where no two devices have the same identifier. With the network layer functions being performed between the RAP 106 and the access terminal 110, a method is needed to route data through the cluster at the link layer and identify the access terminal associated with the data on the wireless backhaul. It is also desirable to use a shorter identifier for the access terminal that may not be unique among all access terminals. One way to accomplish this is by assigning an identifier ("cluster ID") unique to each access terminal in the cluster and including the cluster ID with the data sent over the backhaul. The concept of a cluster ID will be illustrated through the examples provided below.

Returning to FIG. 1, the access terminal 110 accesses the WAN 104 by first opening a connection with the WAP 108c, if one does not already exist. Once this occurs, a data path through the cluster is established for the access terminal 110. The WAP 108c consults an internal routing table (not shown) to identify the best node to route data between the WAN 104 and the access terminal 110 and opens, or maintains an existing, backhaul connection with that node. In this example, a backhaul connection is maintained between the WAP 108c and intermediate WAP 108a, and another backhaul connection is maintained between the intermediate WAP 108a and the RAP 106. The data path may be created using standard protocols between nodes in the cluster to dynamically configure the data paths. Once the data path is established, a network connection may be established between the RAP 106 and the access terminal 110 by assigning an IP address to the access terminal 110, if one has not already been assigned. With an IP address, the access terminal 110 can access the WAN 104.

When a connection is initiated with the access terminal 110, the RAP 106 assigns a cluster ID to the access terminal 110 and maps the cluster ID to the access terminal 110. The RAP 106 uses the cluster ID to exchange signaling messages with the access terminal 110 as part of the process of establishing the connection. As the signaling messages propagate through the cluster 102, each WAP 108a, 108c in the data path similarly maps the cluster ID to the access terminal 110. Once this process is complete, the connection may be established and the access terminal 110 may begin communications with another access terminal or through the WAN.

In an alternative implementation, the cluster ID may be assigned by a WAP 108 in the cluster 102. By way of example, the RAP 106 may provide each WAP 108 with pool of cluster IDs for assignment to the access terminals in the cluster 102. In this example, the WAP 108c may assign the cluster ID to the access terminal 110 when the connection is initiated. The cluster ID is used by the WAP 108c to route signaling messages upstream to the RAP 106 as part of the process of establishing the connection. As the signaling messages propagate upstream, each WAP 108a in the data path maps the cluster ID to the access terminal 110. When the signaling messages reach the RAP 106, the connection may be established and the access terminal 110 may begin communicating with another access terminal or similar device.

Figure 3:
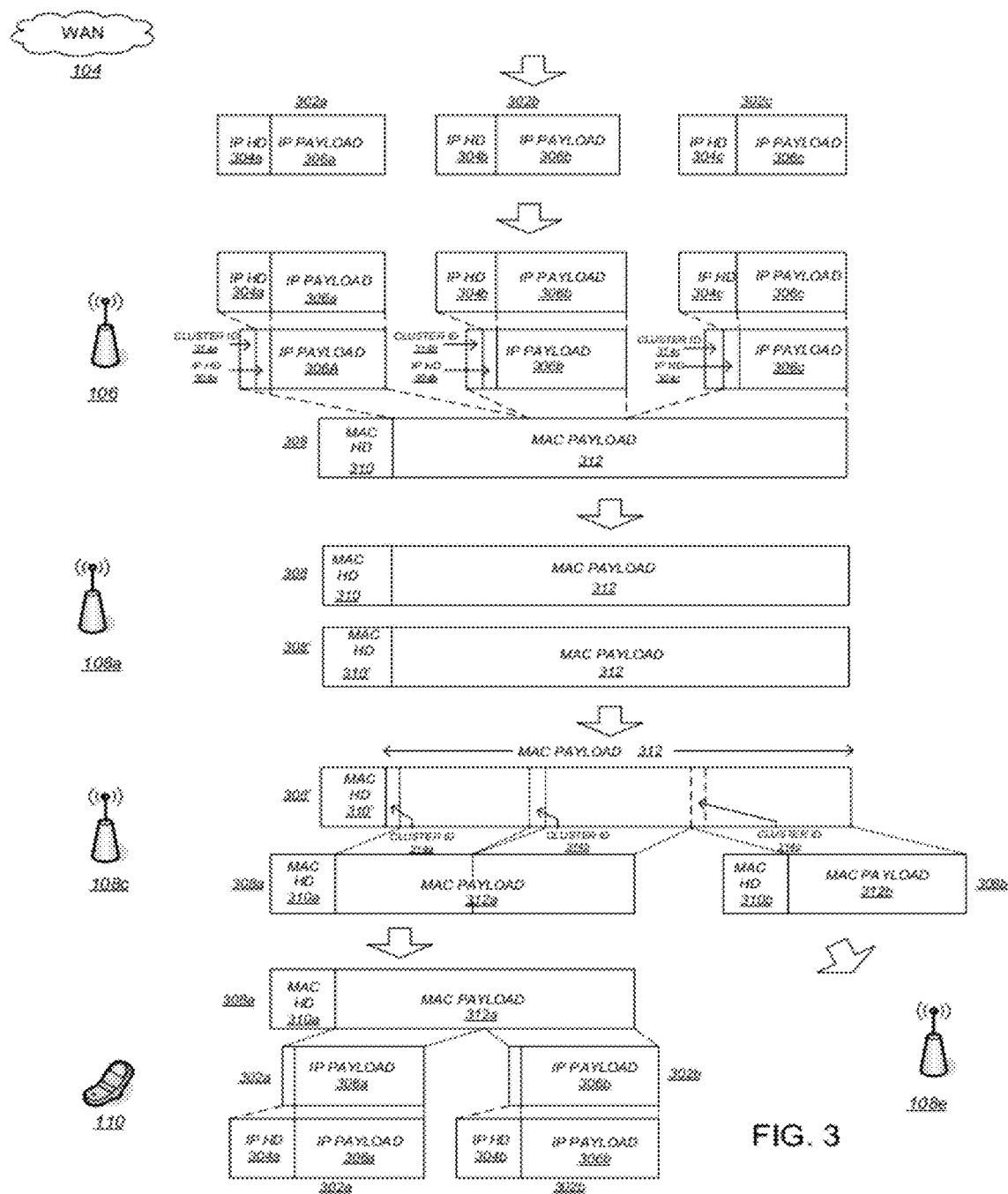
FIG. 3 is a diagram illustrating an example of framing of data routed through the cluster in the downstream direction.

An example illustrating the use of a cluster ID will be presented with reference to FIG. 3. In this example, a WAN 104 employing an Internet Protocol (IP) is used to route IP packets. Each IP packet 302a-302c sent between the WAN 104 and the RAP 106 includes an IP header 304a-304c and an IP payload 306a-306c. The IP header includes a source and destination IP address, which may or may not be compressed by the RAP 106 depending on the particular application. In the downstream direction illustrated in FIG. 3, the RAP 106 compresses the IP header 304a-304c and then adds a cluster ID 314a-314c to each IP packet 302a-302c identifying the destination access terminal. The IP packets 302a-302c are then combined to form the payload 312 for a MAC frame 308 as shown in FIG. 3. Alternatively, the MAC payload 312 may consist of a single IP packet, or any portion of an IP packet. In any event, once the MAC payload 312 is formed, a MAC header 310 is attached to create a MAC frame 308. The contents of the MAC header 310 may vary depending on the type of data being carried in the MAC frame 308, but generally includes, among other things a length of each upper layer packet including headers in the payload.

In an alternative configuration, a single cluster ID may be used for all IP packets, or portions thereof, in a MAC payload. By way of example, a header may be attached to each IP packet with a single bit indicating whether or not a cluster ID is attached. If the bit for an IP packet indicates that a cluster ID is not attached, then the cluster ID for that IP packet is the same as the cluster ID for the previous IP packet, or portion thereof, in the MAC payload.

For clarity of presentation, the term "packet" will be used to describe segments of data routed between the WAN 104 and the RAP 106 and the term "frame" will be used to describe segments of data routed through the cluster. However, those skilled in the art will readily understand that in practical applications the terms are interchangeable and may also be referred to by other terms such as time slots, data bursts, or any other terms that refer to a segment of data.

The MAC frame 308 is routed from the RAP 106 to an intermediate WAP 108a. The WAP 108a examines the cluster ID for each IP packet in the MAC payload 312 and consults it internal routing table to determine the routing (i.e., next hop). In this example, the WAP 108a determines that the IP packets in the MAC payload 312 should be routed through the downstream WAP 108c. Assuming that the payload size for the downstream transmission to the WAP 108c is the same as that received from the RAP 106, the MAC payload 312 can remain in tact for the next hop in the data path. The WAP 108a simply attaches to the MAC payload 312 a new MAC header 310' of the downstream WAP 108c and routes MAC frame 308' downstream.

Although not shown in this example, the WAP 108a may determine that the IP packets in a subsequent MAC payload should be routed through multiple downstream WAPs. In this case, the WAP 108a fragments the MAC payload into multiple MAC payloads, with each MAC payload carrying the IP packets for a different downstream WAP. The MAC payloads are then framed with a MAC header routed downstream to the appropriate WAPs.

Returning to FIG. 3, the WAP 108c receives the MAC frame 308' from the WAP 108a. Upon receipt, the WAP 108c examines the cluster ID for each of the IP packets in the MAC payload 312 and consults it internal routing table to determine the routing (i.e., next hop). In this example, the WAP 108c determines that two of the IP packets in the MAC payload 312 should be routed directly to the access terminal 110 and the other IP packet should be routed to another access terminal (not shown) through downstream WAP 108e. Once this determination is made, the WAP 108c fragments the MAC payload 312 into two MAC payloads 312a, 312b. The first MAC payload 312a is created by striping the cluster ID from each IP packet destined for the access terminal 110 and then combining them. The second MAC payload carries the IP packet for the downstream WAP 108e, with the cluster ID for the other access terminal (not shown). The framing of the first MAC payload 312a includes a MAC header 310a for the access terminal and the framing of the second MAC payload 312b includes a MAC header 310b for the WAP 108e. Once framed, the MAC frames 308a, 308b are routed downstream.

At the access terminal 110, the two IP packets 302a, 302b are recovered from the MAC frame 308a. Next, the IP headers 304a, 304b are decompressed and the IP payloads 306a, 306b are delivered to the upper layers in the access terminal 110 for further processing.

The concept of the cluster ID may be extended to identify multiple flows between the RAP 106 and a single access terminal 110. By way of example, a user on an access terminal 110 may be browsing a web page while engaged in a voice call. In this example, the RAP 106 and the access terminal 110 may maintain separate flows for each. The two flows may be routed differently through the cluster due to quality of service (QoS) requirements. By way of example, a voice call, which typically requires stricter latency than a web browser application, may be assigned a route through the cluster with less hops and/or routed through one or more WAPs that are not heavily loaded.

Returning to the example in FIG. 3, the WAP 108a may determine that the IP packets in the MAC payload 312 for the access terminal 110 belong to different flows (i.e., a telephony and web browser application). A data flow could be used to support frames with the same QoS requirements or packet size, or match a filter over the IP header. By way of example, the WAP 108a may decide to route the IP packet for the web browser application through another downstream WAP to avoid loading WAP 108c supporting high QoS telephony services. This concept will be illustrated with reference to FIG. 4.

Figure 4:
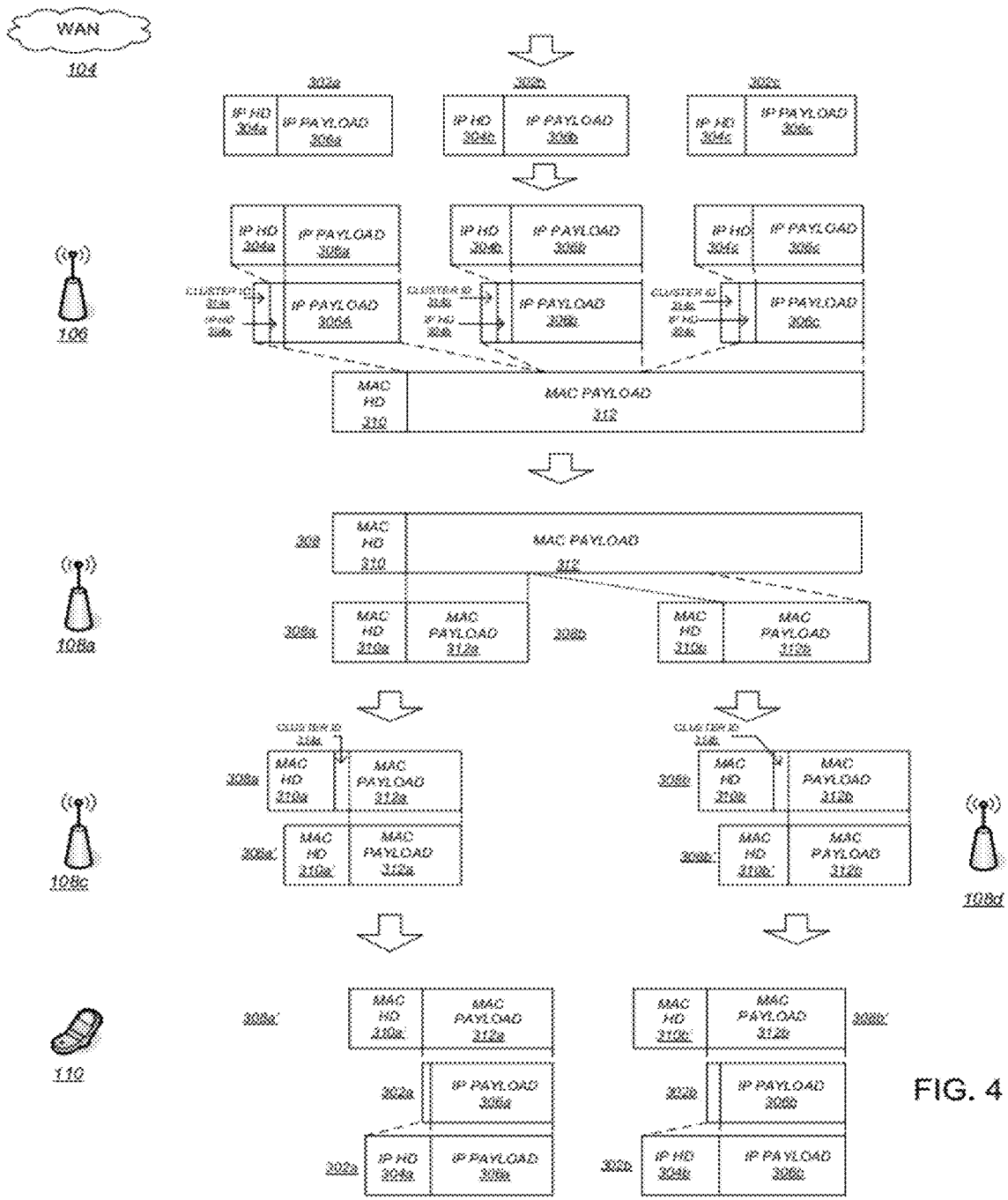
FIG. 4 is a diagram illustrating another example of framing data routed through the cluster in the downstream direction.

Referring to FIG. 4, the WAP 108a fragments the MAC payload 312 into two MAC frames 308a, 308b. The first MAC frame 308a carries the IP packet for the telephony application in the MAC payload 312a and the second MAC frame 308b carries the IP packet for the web browser application in its MAC payload 312b. The first MAC frame 308a includes a MAC header 310a for the downstream WAP 108c and the second MAC frame 308b includes a MAC header 310b for the downstream WAP 108d.

The first MAC frame 308a is routed to the downstream WAP 108c and the second MAC frame 308b is routed to the downstream WAP 108d. The downstream WAP 108c strips the cluster ID from the IP packet in the MAC payload 312a in the MAC frame 308a' and attaches a new MAC header 310a' before routing the MAC frame 308a to the access terminal 110. Similarly, the downstream WAP 108d strips the cluster ID from the IP packet in the MAC payload 312b in the second MAC frame 308b' and attaches a new MAC header 310b' before routing the MAC frame 308b' to the access terminal 110.

Figure 5:
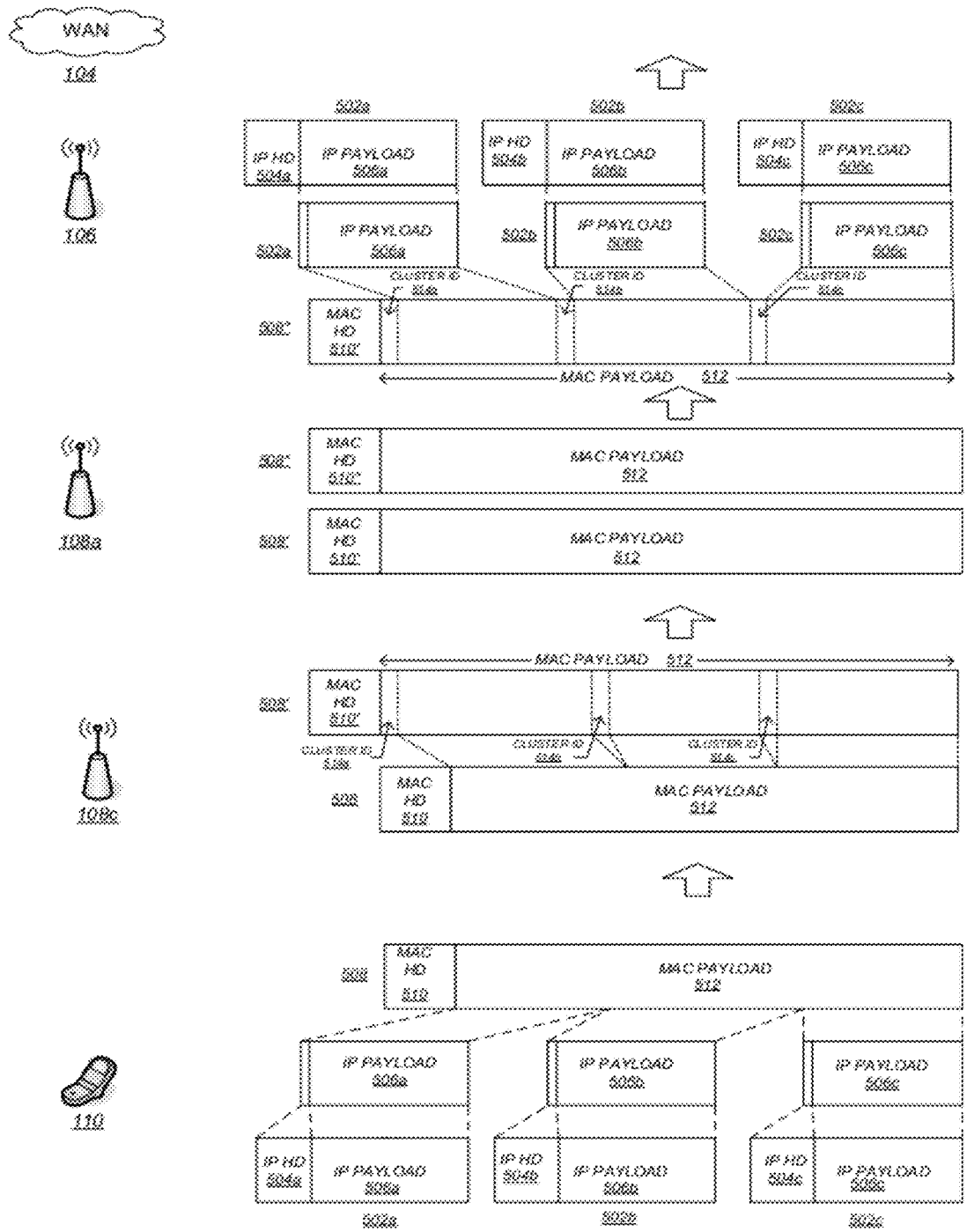
FIG. 5 is a diagram illustrating an example of framing data routed through the cluster in the upstream direction.

The reverse process is performed in the upstream direction. Referring to FIG. 5, the access terminal 110 packages data from the upper layers into IP packets 502a-502c for routing over the WAN 104. Each IP packet 502a-502c includes an IP header 504a-504c and an IP payload 506a-506c. The IP header 502a-502c includes the IP source and destination address. In the upstream direction illustrated in FIG. 5, the IP header 504a-504c in each IP packet 502a-502c is compressed by the access terminal 110, however, header compression may not be required in other configurations. Next, the access terminal 110 determines which WAP to route each IP packet 502a-502c. The IP packets 502 may be routed through a single WAP as shown in FIG. 5, or alternatively, routed through multiple WAPs. In this example, the access terminal 110 combines the IP packets 502a-502c into a MAC payload 512. The MAC payload 512 is framed at the access terminal 110 with a MAC header 510.

The MAC frame 508 is routed from the access terminal 110 to the WAP 108c. The WAP 108c consults its internal routing table to determine the routing (i.e., next hop) for each IP packet 502a-502c in the MAC payload 512. In this example, the WAP 108c determines that the IP packets 502a-502c in the MAC payload 512 should be routed through the upstream WAP 108a. Provided the link layer framing requirements permit, the MAC payload 512 can remain in tact for the next hop in the data path. In this case, the WAP 108c adds the cluster ID 314a-314c to each IP packets in the MAC payload 512 and attaches to the MAC payload 512 a new MAC header 510' for the upstream WAP 108a.

Alternatively, the WAP 108c may decide to combine IP packets, or any portion thereof, from multiple access terminals into a single MAC frame for routing to the upstream WAP 108a. In this example, the WAP 108c would add a cluster ID to each IP packet identifying the access terminal that provided the IP packet.

Returning to FIG. 5, the upstream WAP 108a receives the MAC frame 508' from the downstream WAP 108c. Next, the WAP 108a examines the cluster ID for each IP packet in the MAC payload 512 and consults it internal routing table to determine the routing (i.e., next hop). In this example, the WAP 108a determines that the IP packets 502a-502c should be routed through the RAP 106. Thus, the WAP 108a frames the MAC payload 512 with a new MAC header 508" for the RAP 106. Although not shown, the WAP 108a may add IP packets from other access terminals to the MAC frame 508" with the appropriate cluster IDs. The MAC frame 508" is then routed upstream to the RAP 106.

At the RAP 106, the IP packets 502a-502c are recovered from the MAC frame 508". The IP headers 504a-504c are decompressed before being routed to the WAN 104.

Figure 6:
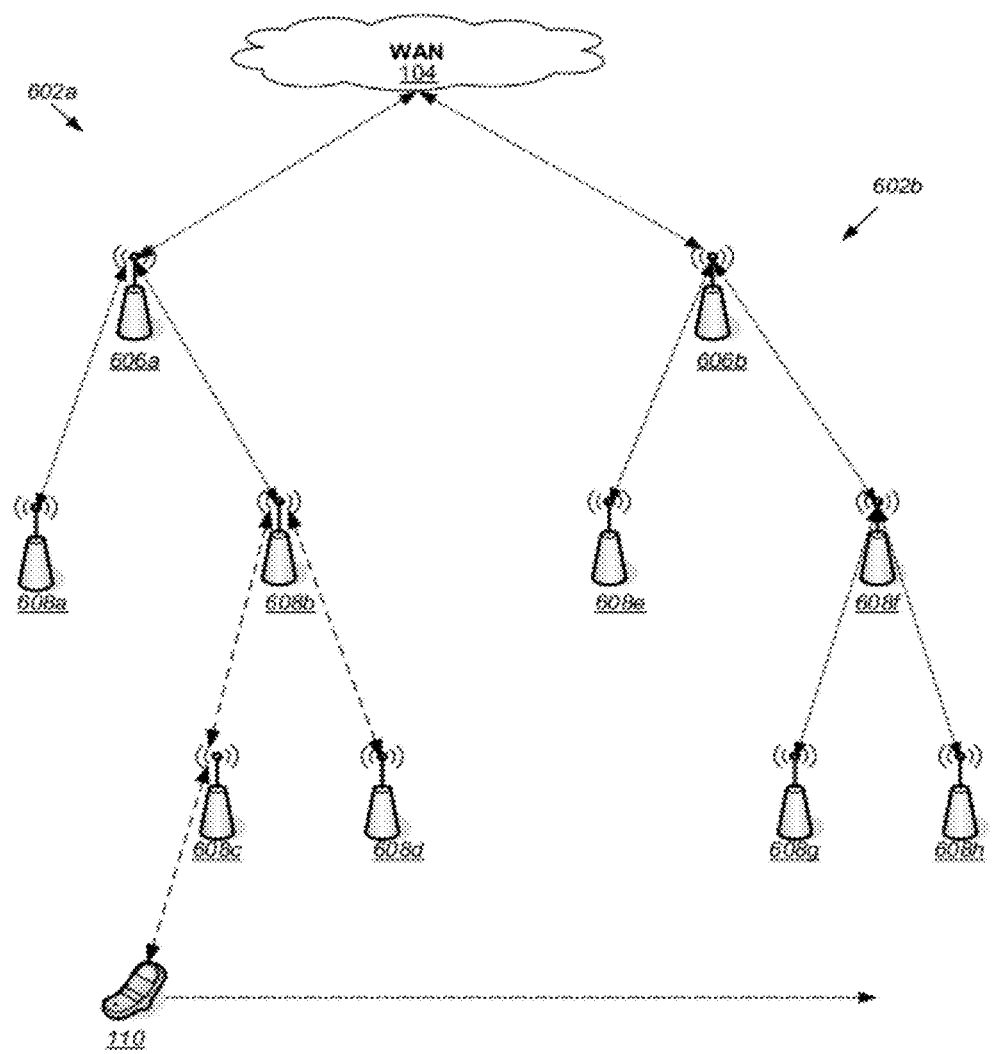
FIG. 6 is a conceptual block diagram illustrating an example of multiple clusters.

FIG. 6 is a conceptual diagram illustrating an example of two clusters connected to a WAN 102. The first cluster 602a includes a RAP 606a with several WAPs 608a-608d disbursed throughout a geographic region. The second cluster 602b also includes a RAP 606b with several WAPs 608e-h disbursed through a different geographic region. In this example, the access terminal 110 initially accesses the WAN 104 through the RAP 606a in the first cluster 602a. The data path between the RAP 606a and the access terminal 110 is through intermediate WAPs 608b, 608c. A cluster ID assigned to the access terminal 110 by the RAP 606a, or another WAP in the cluster 602a. The cluster ID is used to route MAC frames between the RAP 606a and the access terminal 110.

As the access terminal 110 moves from left to right along a series of broken lines in FIG. 6, the access terminal 110 initiates a handoff from the serving WAP 608c to a target WAP 608d. Once the handoff is complete, the target WAP 608d becomes the serving WAP and the data path between the RAP 606a and the access terminal 110 is now through intermediate WAPs 608b, 608d. However, the same cluster ID initially assigned to the access terminal 110 is still used to route MAC frames between the RAP 606a and the access terminal 110.

As the access terminal 110 continues to move along the series of broken lines, it will eventually initiate another handoff from the current serving WAP 608d to a new target WAP 608g. However, because the target WAP 608g is in a different cluster than the serving WAP 608d, the handoff will be coordinated at the network layer in the RAPs 606a, 606b. As part of the handoff procedure, a new cluster ID will be assigned to the access terminal 110 to route MAC frames through the second cluster 602b. The cluster ID assigned by the second cluster 602b is independent of the cluster ID assigned to the access terminal 110 by cluster 602a. The cluster ID will be assigned by the RAP 606b in the second cluster 602b, or by another WAP in that cluster 606b. Once the handoff is complete, MAC frames can be routed directly between the RAP 606b in the second cluster 602b and the WWAN 104, or alternatively tunneled through the RAP 606a in the first cluster 602a.

Figure 7:
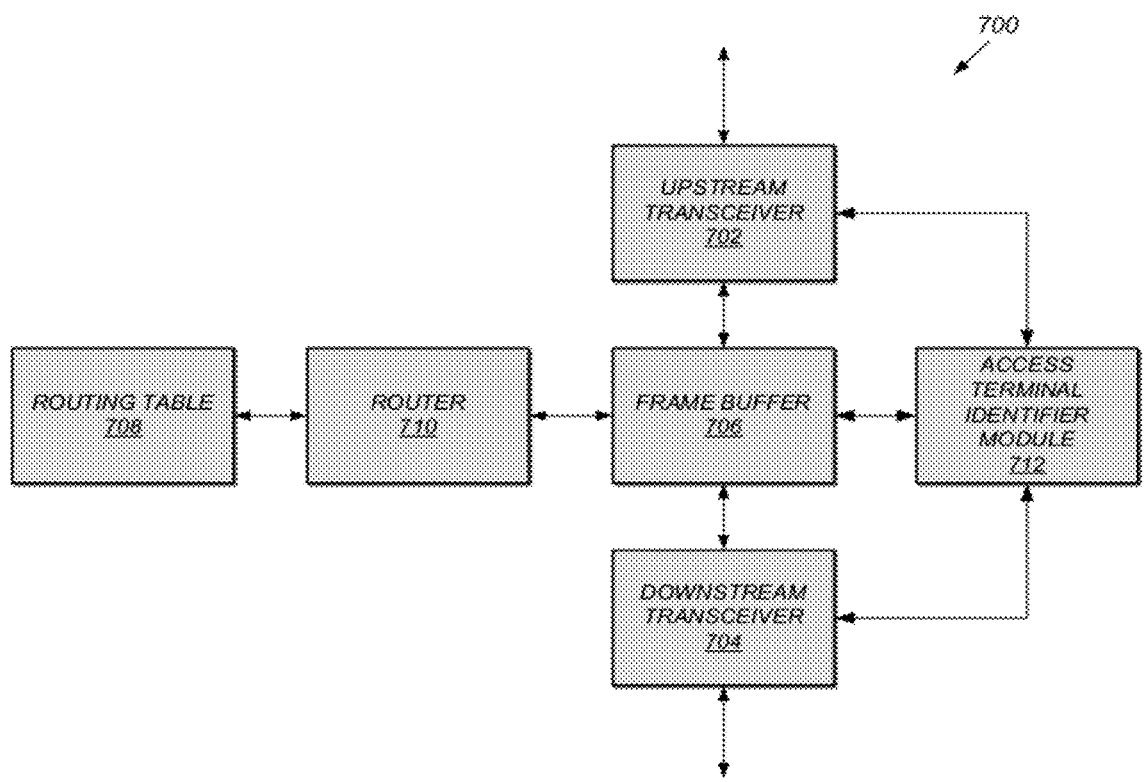
FIG. 7 is a functional block diagram illustrating an example of a node configured to operate in a cluster.

FIG. 7 is a functional block diagram illustrating an example of a node configured to operate in a cluster. The node 700 is shown with separate upstream and downstream transceivers 702, 704, but the transceivers 702, 704 may be integrated into a singe entity or distributed across multiple entities. When the node is operating as a RAP, the upstream transceiver 702 provides a wired interface to a WAN and the downstream transceiver 704 provides a wireless interface to other nodes in the cluster. When the node is operating as a WAP, both the upstream and downstream transceivers 702, 704 provide a wireless interface to other nodes. As discussed earlier, the wireless interface may be configured to support various wireless protocols, including by way of example, WiMAX, infrared, Bluetooth, UMTS, LTE, EV-DO, UMB, Wi-Fi, or others.

The node 700 also includes a frame buffer 706, a routing table 708, a router 710, and an access terminal identifier module 712, all which support both upstream and downstream routing.

When operating as a WAP, the frame buffer 706 is used to store IP packets carried in the payload of MAC frames. The routing table 708 uses the cluster ID attached to each IP packet in the frame buffer 706 to identify the next hop in the data path. The information from the routing table 708 is used by the frame buffer 706 to fragment, consolidate, or otherwise arrange the IP packets into MAC payloads for routing. The router 710 is used to add the MAC header to each MAC frame before providing the frames to the upstream or downstream transceiver 702, 704.

When operating as a RAP, the functionality is slightly different depending on whether the IP packets are being routed downstream or upstream. In the downstream direction, the frame buffer 706 is used to store IP packets from the WAN. The routing table 708 uses the IP address in each IP packet to determine the next hop in the data path for each. Information from the routing table 708 is used by the frame buffer 706 to fragment, consolidate, or otherwise arrange the IP packets into MAC payloads for routing. The router 710 is used to add the MAC ID to each MAC frame before providing the frames to the downstream transceiver 704 for routing.

In the upstream direction, the frame buffer 706 is used to store IP packets carried in the payload of MAC frames. The frame buffer 706 also determines the IP address for each IP packet from the cluster ID. When the header of the IP packet has been compressed by the access terminal, the frame buffer 706 is used to decompress the IP header for each IP packet. When IP packets are fragmented across multiple MAC payloads, the frame buffer 706 uses the cluster ID and the fragmentation information in the payload to reassemble the IP packets before providing the packets to the upstream transceiver 702 for delivery to the WAN.

The access terminal identifier module 712 is used to assign a cluster ID to each access terminal engaged in a connection. The cluster ID may be defined by the access terminal identifier module 712 before the assignment. The cluster ID defined by the access terminal is unique to the cluster and independent of any cluster ID assigned to the access terminal by another cluster. Thus, an access terminal may be assigned multiple cluster IDs, one for each cluster that it connects to. Moreover, the cluster ID defined by the access terminal identifier module 712 for the access terminal may be assigned to access terminals in other clusters Alternatively, the cluster ID for the access terminal may be provided from another node in the cluster. In this case, a pool of identifiers will generally be provided by the RAP, or another node, to the access terminal identifier module 712. The access terminal identifier module 712 uses the pool to assign cluster IDs to multiple access terminals. In the event that the node does not assign the cluster ID, the access terminal identifier module 712 records the cluster ID for each access terminal in its data path as the signaling messages propagate through the cluster to establish a connection or support a handoff at the network layer. In another aspect a separate signaling message is sent to each node in the cluster on the path from the access terminal to the RAP.

The node 700 is shown with various blocks to illustrate its functionality. These functional blocks may be implemented in hardware, software, firmware, middleware, microcode, hardware description languages, or any combination thereof. By way of example, one or more functional blocks may be implemented with program code or code segments on a microprocessor, a digital signal processor (DSP), or any other platform capable of supporting software applications. A code segment may represent a procedure, a function, a subprogram, a program, a routine, a subroutine, a module, or any combination of instructions, data structures, or program statements. The program code or code segments may reside in computer readable media. The computer readable media may include one or more storage devices, including by way of example, RAM memory, flash memory, ROM memory, EPROM memory, EEPROM memory, registers, hard disk, a removable disk, a CD-ROM, or any other form of storage media known in the art. Computer readable media may also include a carrier wave that encodes a data signal.

Alternatively, or in addition to, one or more functional blocks may be implemented with an application specific integrated circuit (ASIC), a controller, microcontroller, a state machine, a field programmable gate array (FPGA) or other programmable logic component, discrete gate or transistor logic, discrete hardware components, or any combination thereof.

Those skilled in the art will recognize the interchangeability of hardware, firmware, and software configurations under these circumstances, and how best to implement the described functionality for each particular application.

Figure 8:
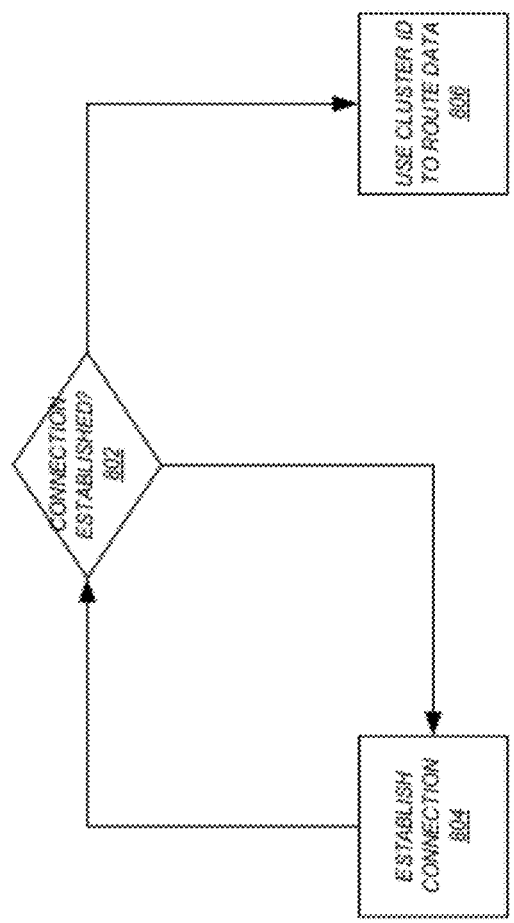
FIG. 8 is a flow chart illustrating an example of a process used by a node to operate in a cluster.

FIG. 8 is a flow diagram illustrating an example of the operation of a node. In step 802, the node determines whether it needs to assist an access terminal in the cluster to establish a connection or whether the access terminal is engaged in an active connection. If the access terminal is not engaged in an active connection, then the node will assist in establishing the connection. The process of establishing the connection includes assigning a cluster ID to the access terminal. The node may assign the cluster ID. The assigned cluster ID may be defined by the node or provided to the node by another node in the cluster. Alternatively, the node can define and provide the cluster ID to another node in the cluster for assigning to the access terminal. If the access terminal supports multiple flows, multiple cluster IDs may be assigned.

If the access terminal is engaged in a connection, then the node will use the cluster ID assigned to the access terminal, in step 806, to route data associated with the access terminal to another node in the cluster. If the node is a RAP, the process of routing data will include converting between the cluster ID and the IP address assigned to the access terminal to support access to a WAN. If the node has a link layer connection with the access terminal, the cluster ID is not used to route data to from the access terminal.

Figure 9:
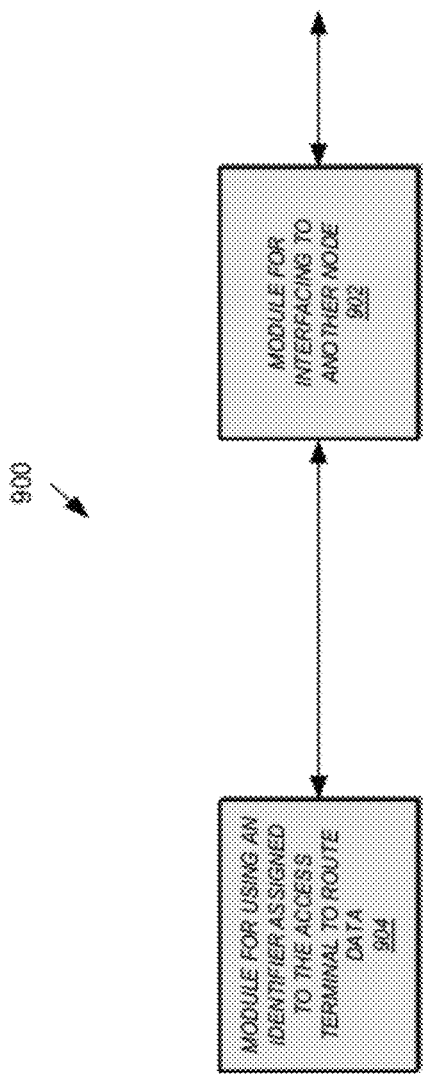
FIG. 9 is another functional block diagram illustrating an example of a node configured to operate in a cluster.

FIG. 9 is a functional block diagram illustrating an example of a node configured to operate in a cluster. The node 900 includes a module 902 for interfacing to another node in the cluster, and a module 904 for using an identifier assigned to an access terminal to route data associated with the access terminal to said another node. The identifier is assigned by any node in the cluster.

Various aspects of the disclosure are described above. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, a node may be configured to operate in a cluster with frame buffer configured to use an identifier assigned to an access terminal to route data associated with the access terminal to another node in the cluster. The identifier may be assigned by the node or a different node in the cluster. The node may support a plurality of data flows or a single data flow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus configured to operate in a cluster, comprising:
   an access terminal identifier module configured to assign one or more identifiers to an access terminal, wherein the one or more identifiers identify the access terminal solely within the cluster; and
   a frame buffer configured to use the one or more identifiers assigned to the access terminal to route data associated with the access terminal to a node in the cluster, wherein the data is associated with one or more data flows,
   wherein the access terminal identifier module is further configured to assign each of the one or more identifiers to a different one of the one or more data flows, wherein the one or more identifiers identify the one or more data flows solely within the cluster.

2. The apparatus of claim 1, wherein the access terminal identifier module is further configured to define the one or more identifiers prior to assignment.

3. The apparatus of claim 1, wherein the data in one of the one or more data flows comprises frames with the same quality of service requirements or same frame size.

4. The apparatus of claim 1, wherein the data in one of the one or more data flows comprises frames matching a filter.

5. The apparatus of claim 1, further comprising a transceiver, and wherein the frame buffer is further configured to support a wired connection, through the transceiver, to a network outside the cluster.

6. The apparatus of claim 5, wherein the frame buffer is further configured to support communications by the access terminal over the network by providing a conversion between the one or more identifiers and an address assigned to the access terminal by the network.

7. The apparatus of claim 1, further comprising a transceiver, and wherein the frame buffer is further configured to support communications by the access terminal over a network outside the cluster by routing the data, through the transceiver, to the node.

8. The apparatus of claim 1, wherein the access terminal identifier module is configured to receive the one or more identifiers from the node or another node in the cluster.

9. The apparatus of claim 1, further comprising a transceiver capable of supporting a link layer connection with the access terminal, and wherein the frame buffer is further configured to route data to and from the node using the one or more identifiers and route data to and from the access terminal without using the one or more identifiers if the transceiver has a link layer connection with the access terminal.

10. The apparatus of claim 1, wherein the frame buffer is further configured to use the one or more identifiers assigned to the access terminal to route data associated with the access terminal to another node in the cluster by attaching the one or more identifiers to one or more segments of the data.

11. The apparatus of claim 10, wherein the frame buffer is further configured to attach a different identifier to data associated with another access terminal, and route data for the access terminal and said another access terminal, with their respective identifiers, in a single frame.

12. A method of operating an apparatus in a cluster, comprising:
   assigning one or more identifiers to an access terminal, wherein the one or more identifiers identify the access terminal solely within the cluster;
   using the one or more identifiers assigned to the access terminal to route data associated with the access terminal to a node in the cluster, wherein the data is associated with one or more data flows; and
   assigning each of the one or more identifiers to a different one of the one or more data flows, wherein the one or more identifiers identify the one or more data flows solely within the cluster.

13. The method of claim 12, further comprising defining the one or more identifiers prior to assignment.

14. The method of claim 12, wherein the data in one of the one or more data flows comprises frames with the same quality of service requirements or same frame size.

15. The method of claim 12, wherein the data in one of the one or more data flows comprises frames matching a filter.

16. The method of claim 12, further comprising supporting a wired connection to a network outside the cluster.

17. The method of claim 16, further comprising providing a conversion between the one or more identifiers and an address assigned to the access terminal by the network.

18. The method of claim 12, further comprising supporting communications by the access terminal over a network outside the cluster by routing the data to the node.

19. The method of claim 12, further comprising receiving the one or more identifiers from the node or another node in the cluster.

20. The method of claim 12, further comprising routing data to and from the node using the one or more identifiers, and routing data to and from the access terminal without using the one or more identifiers if the apparatus has a link layer connection with the access terminal.

21. The method of claim 12, wherein using the one or more identifiers assigned to the access terminal to route data associated with the access terminal to a node in the cluster further comprises attaching the one or more identifiers to one or more segments of the data.

22. The method of claim 21, further comprising attaching a different identifier to data associated with another access terminal, and routing data for the access terminal and said another access terminal, with their respective identifiers, in a single frame.

23. A computer program product, comprising:
   a computer-readable storage device comprising code executable by at least one computer to:
      assign one or more identifiers to an access terminal, wherein the one or more identifiers identify the access terminal solely within a cluster;
      use the one or more identifiers assigned to the access terminal to route data associated with the access terminal to a node in the cluster, wherein the data is associated with one or more data flows; and
      assign each of the one or more identifiers to a different one of the one or more data flows, wherein the one or more identifiers identify the one or more data flows solely within the cluster.

24. An apparatus configured to operate in a cluster, comprising:
   means for assigning one or more identifiers to an access terminal, wherein the one or more identifiers identify the access terminal solely within the cluster;

means for using the one or more identifiers assigned to the access terminal to route data associated with the access terminal to a node in the cluster, wherein the data is associated with one or more data flows; and means for assigning each of the one or more identifiers to a different one of the one or more data flows, wherein the one or more identifiers identify the one or more data flows solely within the cluster.

25. An access point comprising:

an antenna;

an access terminal identifier module configured to assign one or more identifiers to an access terminal, wherein the one or more identifiers identify the access terminal solely within a cluster; and a frame buffer configured to use the one or more identifiers assigned to the access terminal to route data associated with the access terminal to a node in the cluster via the antenna, wherein the data is associated with one or more data flows, wherein the access terminal identifier module is further configured to assign each of the one or more identifiers to a different one of the one or more data flows, wherein the one or more identifiers identify the one or more data flows solely within the cluster.

26. A mobile phone comprising:

an access terminal identifier module configured to assign one or more identifiers to an access terminal, wherein the one or more identifiers identify the access terminal solely within a cluster;

a frame buffer configured to use the one or more identifiers assigned to the access terminal to route data associated with the access terminal to a node in the cluster via the antenna, wherein the data is associated with one or more data flows; and a user interface configured to display the data, wherein the access terminal identifier module is further configured to assign each of the one or more identifiers to a different one of the one or more data flows, wherein the one or more identifiers identify the one or more data flows solely within the cluster.

* * * * *